(12) United States Patent
Kim et al.

(10) Patent No.: US 9,484,763 B2
(45) Date of Patent: Nov. 1, 2016

(54) BATTERY PACK AND METHOD OF CONTROLLING THE SAME

(71) Applicant: Samsung SDI Co., Ltd., Yongin-si, Gyeonggi-do (KR)

(72) Inventors: Bong-Young Kim, Yongin-si (KR); Ki-Ho Shin, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 716 days.

(21) Appl. No.: 13/826,479

(22) Filed: Mar. 14, 2013

(65) Prior Publication Data

US 2014/0103876 A1    Apr. 17, 2014

(30) Foreign Application Priority Data

Oct. 16, 2012  (KR) ........................ 10-2012-0115030

(51) Int. Cl.
  *H02J 7/00*         (2006.01)
(52) U.S. Cl.
  CPC .............. *H02J 7/007* (2013.01); *H02J 7/0014* (2013.01); *H02J 7/0024* (2013.01)
(58) Field of Classification Search
  USPC ........................................ 320/112, 116, 137
  See application file for complete search history.

(56) References Cited

U.S. PATENT DOCUMENTS

| 5,889,385 A * | 3/1999 | Podrazhansky ....... H02J 7/0016 320/130 |
| 2003/0155891 A1* | 8/2003 | Ishishita .............. G01R 31/362 320/134 |
| 2007/0268000 A1* | 11/2007 | Kobayashi ............ H02J 7/0019 320/118 |
| 2008/0012529 A1* | 1/2008 | Chang ............... H01M 10/4207 320/116 |
| 2010/0055543 A1 | 3/2010 | Tae et al. |
| 2010/0253285 A1* | 10/2010 | Takahashi ............. H02J 7/0016 320/118 |

FOREIGN PATENT DOCUMENTS

| JP | 2996076 B2 | 10/1999 |
| KR | 10-0995075 B1 | 11/2010 |
| KR | 10-2012-0012660 A | 2/2012 |

* cited by examiner

*Primary Examiner* — Drew A Dunn
*Assistant Examiner* — Zixuan Zhou
(74) *Attorney, Agent, or Firm* — Robert E. Bushnell, Esq.

(57) ABSTRACT

A battery pack and a method of controlling the same. The battery pack includes: a first battery module that includes at least one battery cell; a second battery module that includes at least one battery cell electrically connected to the first battery module; a charge/discharge control unit that breaks or connects a charge/discharge path of each of the first battery module and the second battery module; a first battery management unit that controls the first battery module; and a second battery management unit that generates a signal for controlling switches included in the charge/discharge control unit by referring to a state of the second battery module, wherein the first battery management unit and the second battery management unit are connected in parallel to the charge/discharge control unit.

13 Claims, 5 Drawing Sheets

BATTERY PACK AND METHOD OF CONTROLLING THE SAME

CLAIM OF PRIORITY

This application makes reference to, incorporates the same herein, and claims all benefits accruing under 35 U.S.C. §119 from an application for BATTERY PACK AND METHOD OF CONTROLLING THE SAME earlier filed in the Korean Intellectual Property Office on 16 Oct. 2012 and there duly assigned Serial No. 10-2012-0115030.

BACKGROUND OF THE INVENTION

1. Field of the Invention

One or more embodiments of the present invention relate to a battery pack and a method of controlling the same.

2. Description of the Related Art

As portable electronic devices such as mobile phones, digital cameras, and laptops have been widely used, batteries that supply power for operating such portable electronic devices have been actively developed.

A battery is provided as a battery pack including a battery cell and a protection circuit that includes a battery management unit for controlling charge/discharge of the battery cell. In the battery pack, the battery cell or the protection circuit may malfunction during charging or discharging. Accordingly, the protection circuit includes various devices to stably control charge/discharge of the battery cell.

SUMMARY OF THE INVENTION

One or more embodiments of the present invention include a battery pack including a protection circuit that may control charge/discharge of additional battery cells, and a method of controlling the battery pack.

Additional aspects will be set forth in part in the description which follows and, in part, will be apparent from the description, or may be learned by practice of the presented embodiments.

According to an aspect of the present invention, a battery pack includes: a first battery module that includes at least one battery cell; a second battery module that includes at least one battery cell electrically connected to the first battery module; a charge/discharge control unit that breaks or connects a charge/discharge path of each of the first battery module and the second battery module; a first battery management unit that controls the first battery module; and a second battery management unit that generates a signal for controlling switches included in the charge/discharge control unit by referring to a state of the second battery module, wherein the first battery management unit and the second battery management unit are connected in parallel to the charge/discharge control unit.

The charge/discharge control unit may include a charge control switch and a discharge control switch.

The first battery management unit may generate a signal for controlling the charge control switch and the discharge control switch included in the charge/discharge control unit by detecting a state of the first battery module.

The first battery management unit may generate a signal for directly controlling the charge control switch or the discharge control switch by referring to the state of the first battery module, and the second battery management unit may generate a signal for controlling the charge control switch or the discharge control switch through switch elements connected to the second battery management unit by referring to the state of the second battery module.

The second battery management unit may include: a cell control unit that determines whether there is a risk of overcharge or over discharge by detecting a state of each of the at least one battery cell included in the second battery module; and a first switch and a second switch that operate by receiving a signal from the cell control unit.

The second battery management unit may generate a signal for turning on the first switch when there is a risk of over discharge in the at least one battery cell included in the second battery module.

When the first switch is turned on, a third switch that is connected to the first switch and is included in the charge/discharge control unit may be turned on and the discharge control switch that is connected to the third switch may be turned off.

The second battery management unit may generate a signal for turning on the second switch when there is a risk in the at least one battery cell included in the second battery module.

When the second switch is turned on, a fourth switch that is connected to the second switch and is included in the charge/discharge control unit may be turned on and the charge control switch that is connected to the fourth switch may be turned off.

The second battery management unit may generate a signal for turning off the first switch or the second switch when the at least one battery cell included in the second battery module is in a normal state with no risk of overcharge or over discharge.

When the first switch is turned off, a third switch that is connected to the first switch and is included in the charge/discharge control unit may be turned off and the discharge control switch that is connected to the third switch may be turned on.

When the second switch is turned off, a fourth switch that is connected to the second switch and is included in the charge/discharge control unit may be turned off and the charge control switch that is connected to the fourth switch may be turned on.

The cell control unit may determine whether there is a risk of overcharge or over discharge in the at least one battery cell included in the second battery module by comparing a state of charge (SOC) of each of the at least one battery cell with a reference SOC.

When battery cells the number of which exceeds the number of battery cells that may be managed by the first battery management unit are required, the second battery module may be a set of surplus battery cells added to the first battery module.

The first battery management unit may include: an analog front end that converts an analog value about a state of the first battery module into a digital value; a microprocessor that transmits a signal to the charge/discharge control unit; a memory that stores a setting value of the microprocessor.

When the switches included in the charge/discharge control unit are metal-oxide semiconductor field-effect transistors (MOSFETs), the charge/discharge control unit may include a resistor for adjusting a voltage applied to gates of the switches.

The charge/discharge control unit may additionally include a switch for breaking or connecting the charge/discharge path of the first battery module and a switch for breaking or connecting the charge/discharge path of the second battery module.

According to another aspect of the present invention, a method of controlling a battery pack includes: determining a state of a second battery module that includes at least one battery cell electrically connected to a first battery module; and when it is determined that there is a risk of overcharge or over discharge in the second battery module, generating a signal for controlling switch elements connected to a charge control switch or a discharge control switch.

According to another aspect of the present invention, a battery pack includes: a first battery module that includes at least one battery cell; a second battery module that includes at least one battery cell electrically connected to the first battery module; a protection circuit that controls charge/discharge of the first battery module and the second battery module; and a terminal unit that connects the first battery module and the second battery module to an external device, wherein the protection circuit includes: a charge/discharge control unit that breaks or connects a charge/discharge path of each of the first battery module and the second battery module; and a second battery management unit that generates a signal for controlling switches included in the charge/discharge control unit by referring to a state of the second battery module.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
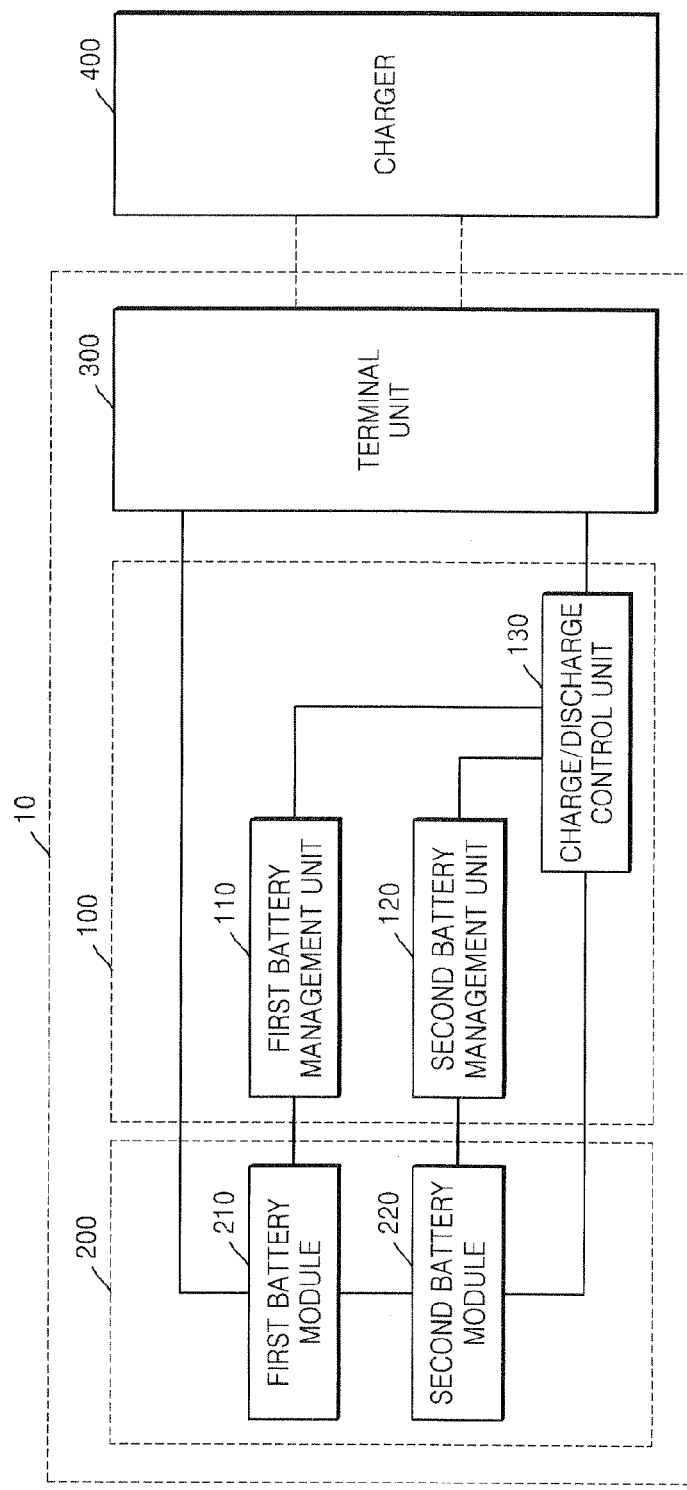
FIG. 1 is a block diagram illustrating a system including a battery pack according to an embodiment of the present invention.

The present invention will now be described more fully with reference to the accompanying drawings, in which exemplary embodiments of the invention are shown. The embodiments are described in detail to enable one or ordinary skill in the art to make and use the present invention.

It would be understood that the various embodiments are different but are not exclusive. For example, particular shapes, structures, or characteristics described herein may be modified between embodiments without departing from the scope of the present invention. Also, it would be understood that positions or arrangements of individual elements in each embodiment may be modified without being departed from the scope of the present invention. Accordingly, the detailed description should be considered in a descriptive sense only and not for purposes of limitation, and various changes in form and details may be made therein without departing from the spirit and scope of the one or more embodiments of the present invention as defined by the following claims. In the drawings, like reference numerals denote like elements in various aspects.

The present invention will now be described more fully with reference to the accompanying drawings, in which exemplary embodiments of the invention are shown, to enable one of ordinary skill in the art to easily make and use the present invention. As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram illustrating a system including a battery pack 10 according to an embodiment of the present invention.

Referring to FIG. 1, the battery pack 10 includes a battery protection circuit 100, a battery module 200, and a terminal unit 300. The battery pack 10 may be connected to a charger 400 to be supplied with sufficient power.

The battery protection circuit 100 controls charging and discharging of the battery module 200, dependent upon whether the battery pack 10 is in a charge mode or a separate discharge mode. For example, battery pack 10 is in a charge mode when connected to charger 400, and in a discharge mode when connected to supply power an external device.

The battery protection circuit 100 may perform an overcharge protection function, an over discharge protection function, an overcurrent protection function, an overvoltage protection function, and an overheat protection function in order to protect the battery module 200. To this end, the battery protection circuit 100 may monitor a voltage, current, temperature, remaining power, lifetime, or state of charge (SOC) of some of battery cells in the battery module 200.

The battery protection circuit 100 may include a first battery management unit 110, a second battery management unit 120, and a charge/discharge control unit 130. The first battery management unit 110 is a battery management device or circuit that controls a battery cell in a digital manner, and the second battery management unit 120 is a battery management device or circuit that controls a battery cell in an analog manner. The first battery management unit 110 and the second battery management unit 120 prevent overcharge or over discharge of the battery module 200 by using the charge/discharge control unit 130. A structure of the battery protection circuit 100 will be explained in detail below.

The battery module 200 is a rechargeable secondary battery, and supplies stored power to another device (not shown). In FIG. 1, the battery module 200 may be separated from the battery protection circuit 100. The battery module 200 may be a set of rechargeable secondary batteries.

The battery module 200 includes a first battery module 210 and a second battery module 220. The number of battery cells included in the first battery module 210 is equal to or less than the number of battery cells which the first battery management unit 110 may control. When battery cells the number of which exceeds the number of battery cells which the first battery management unit 110 may control are required, the second battery module 220 may be a set of surplus battery cells added to the first battery module 210.

Also, the terminal unit 300 may connect the battery module 200 to an external device, and the charger 400 may supply power to the battery module 200 to charge the battery module 200.

Various embodiments of the battery pack 10 will be explained below.

Figure 2:
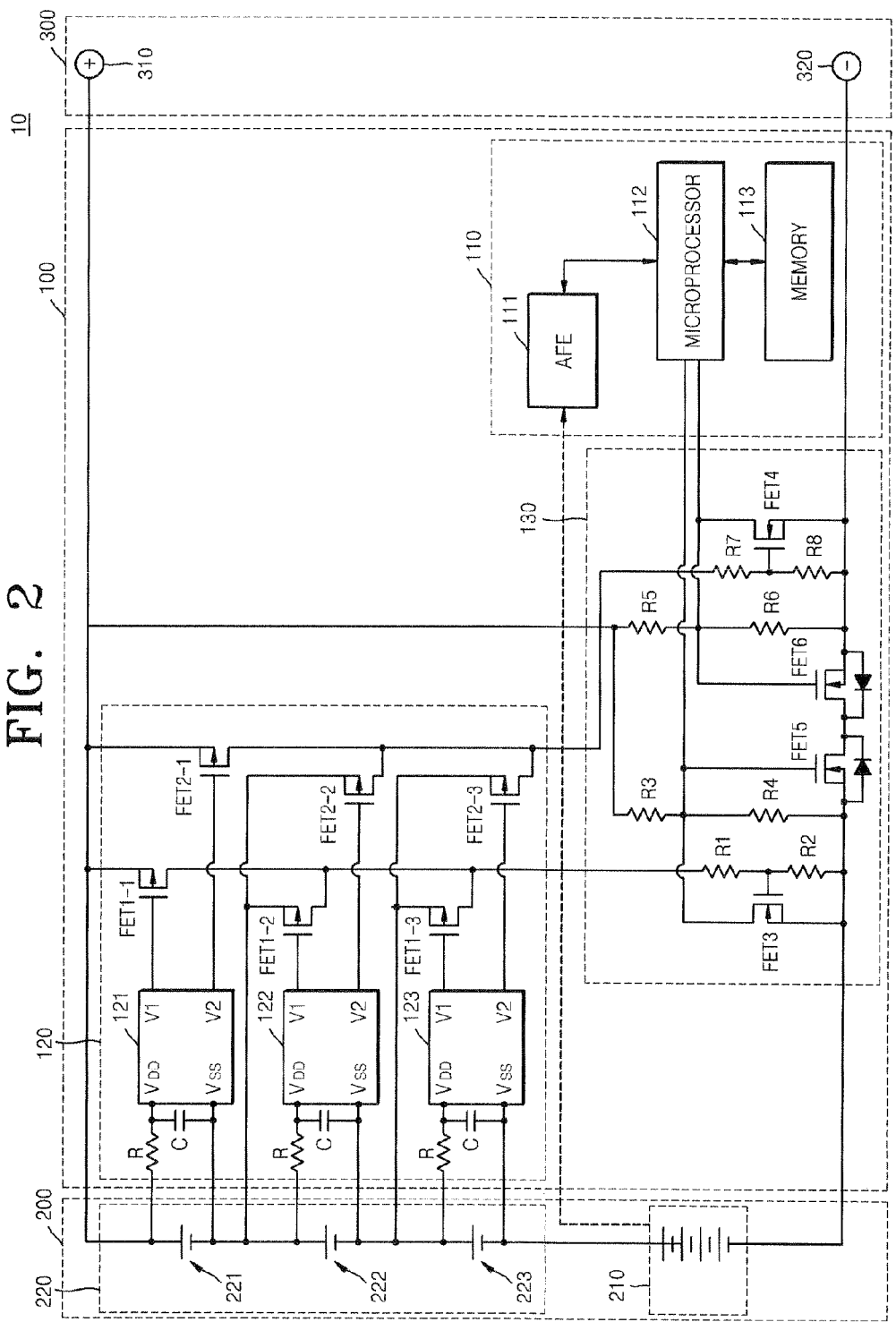
FIG. 2 is a circuit diagram illustrating the battery pack according to an embodiment of the present invention.

FIG. 2 is a circuit diagram illustrating the battery pack 10 according to an embodiment of the present invention.

The battery pack 10 may include the battery protection circuit 100, the battery module 200, and the terminal unit 300, and the battery protection circuit 100 includes the first battery management unit 110, the second battery management unit 120, and the charge/discharge control unit 130.

A first battery module 210 is a set of battery cells which may communicate with the first battery management unit 110. The first battery module 210 supplies stored power to an external device. When the charger 400 (FIG. 1) is connected to the battery pack 10, the first battery module 210 may be charged with external power.

The first battery module 210 may include at least one battery cell. Each of the at least one battery cell may be a rechargeable secondary battery such as a nickel-cadmium battery, a lead storage battery, a nickel metal hydride (NiMH) battery, a lithium-ion battery, or a lithium polymer battery. In FIG. 2, the number of battery cells included in the first battery module 210 may be equal to or less than four.

Charge/discharge of the first battery module 210 is controlled by the first battery management unit 110. The amount of charge, temperature, or SOC of the first battery module 210 is measured by the first battery management unit 110. When overcharge or over discharge of the first battery module 210 is detected, the first battery management unit 110 generates a signal for stopping charge/discharge of the first battery module 210 and applies the signal to the charge/discharge control unit 130.

Next, the second battery module 220 is a battery module including surplus battery cells added to the first battery module 210. The second battery module 220 may include at least one battery cell. Each of the at least one battery cell may be a rechargeable secondary battery such as a nickel-cadmium battery, a lead storage battery, a NiMH battery, a lithium-ion battery, or a lithium polymer battery. In FIG. 2, the second battery module 220 may include three battery cells, that is, first through third battery cells 221, 222, and 223.

The first through third battery cells 221, 222, and 223 included in the second battery module 220 are respectively connected to cell control units 121, 122, and 123 of the second battery management unit 120. That is, both ends of the first through third battery cells 221, 222, and 223 in the second battery module 220 are respectively connected to the cell control units 121, 122, and 123. When there is a risk of overcharge or over discharge in the second battery module 220, the second battery management unit 120 may control charge/discharge by generating a signal for controlling switches included in the charge/discharge control unit 130. A method performed by the second battery management unit 120 to control charge/discharge of the second battery module 220 will be explained below by describing a structure of the battery protection circuit 100.

Referring to FIG. 2, the battery protection circuit 100 includes the first battery management unit 110, the second battery management unit 120, and the charge/discharge control unit 130.

The first battery management unit 110 includes an analog front end (AFE) 111, a microprocessor 112, and a memory 123. As described above, the first battery management unit 110 may control charge/discharge and temperature of the first battery module 210, and may communicate with the first battery module 210.

The first battery management unit 110 transmits information about a voltage, current, and temperature of each battery cell in the first battery module 210 to the microprocessor 112 through the analog front end (AFE) 111. The analog front end (AFE) 111 in the first battery management unit 110 receives information about a state of each battery cell in the first battery module 210. The microprocessor 112 analyzes the information and when it is determined that there is a risk of overcharge or over discharge in the first battery module 210, breaks a charge/discharge path by controlling a charge control switch FET6 or a discharge control switch FET5 of the charge/discharge control unit 130.

The analog front end (AFE) 111 receives a value corresponding to the state of the first battery module 210 and converts the value which is an analog value to a digital value which the microprocessor 112 may process. The analog front end (AFE) 111 may include an analog-to-digital converter (not shown). The value corresponding to the state of the first battery module 210 is converted by the analog-to-digital converter and then is transmitted to the microprocessor 112.

The microprocessor 112 receives the value corresponding to the state of the first battery module 210 from the analog front end (AFE) 111 and determines the state of the first battery module 210. When a voltage of the first battery module 210 is equal to or greater than a charge limit or equal to or less than a discharge limit, the microprocessor 112 determines that the first battery module 210 is not in a normal state. Also, when an abnormality such as overcharge, over discharge, overcurrent, or abnormal temperature occurs in the first battery module 210, the microprocessor 112 generates a signal for controlling the charge/discharge control unit 130 according to a preset value. For example, when it is determined that the first battery module 210 is in an overcharge state, the microprocessor 112 generates and outputs a signal for turning off the charge control switch FET6. On the contrary, when it is determined that the first battery module 210 is in an over discharge state, the microprocessor 112 generates and outputs a signal for turning off the discharge control switch FET5.

In detail, when the charge control switch FET6 or the discharge control switch FET5 is an n-type metal-oxide semiconductor (NMOS), the microprocessor 112 may generate a low-level signal for turning off a charge switch or a discharge switch. The low-level signal may be a ground voltage.

Also, the microprocessor 112 may store a control value of the first battery module 210 in the memory 113. The memory 113 may be an electrically erasable programmable read-only memory (EEPROM) or a flash memory.

The number of battery cells may vary according to a specification of the battery management unit for managing a battery module. In FIG. 2, the number of battery cells which the first battery management unit 110 may manage may be the number of battery cells included in the first battery module 210. That is, for example, in FIG. 2, the number of battery cells which the first battery management unit 110 may manage may be four. In order to control a battery module including battery cells the number of which exceeds four, a suitable battery management unit is required. However, the suitable battery management which may manage many battery cells is expensive. Accordingly, the present invention provides a battery pack which may further include additional battery cells while using an existing battery management unit.

In FIG. 2, in the battery pack 10 in which the second battery module 220 is additionally provided to the first battery module 210, the second battery management unit 120 is additionally provided to connect the second battery module 220 without increasing a specification of the first battery management unit 110. While the first battery management unit 110 includes the analog front end (AFE) 111 and controls charge/discharge of the first battery module 210 in a digital manner, the second battery management unit 120 includes the cell control units 121, 122, and 123, and controls charge/discharge of the second battery module 220 by using switch elements in an analog manner.

As described above, the second battery module 220 may be used when surplus battery cells are additionally required to the battery cells included in the first battery module 210. That is, the second battery module 220 may be a set of battery cells in addition to the first battery module 210 that is basically used, and a set of rechargeable secondary batteries.

Referring to FIG. 2, the second battery management unit 120 may include the cell control units 121, 122, and 123, first switches FET1-1, FET1-2, and FET1-3, and second switches FET2-1, FET2-2, and FET2-3.

The cell control units 121, 122, and 123 monitor states of the first through third battery cells 221, 222, and 223 of the second battery module 220, respectively. The cell control units 121, 122, and 123 respectively monitor whether the first through third battery cells 221, 222, and 223 of the second battery module 220 respectively connected to the cell control units 121, 122, and 123 are in overcharge states or over discharge states. Each of the cell control units 121, 122, and 123 may receive information about a voltage of each cell by using a VDD terminal and a VSS terminal. In order to receive accurate information about the voltage, a resistor R and a capacitor C, which act as filters, may be respectively connected between each of the cell control units 121, 122, and 123 and each of the first through third battery cells 221, 222, and 223 of the second battery module 220.

When it is determined that the first through third battery cells 221, 222, and 223 are in overcharge or over discharge states, the cell control units 121, 122, and 123 generate signals for turning on the first switches FET 1-1, FET 1-2, and FET 1-3 or the second switches FET2-1, FET2-2, and FET2-3. The first switches FET1-1, FET1-2, and FET1-3 and the second switches FET2-1, FET2-2, and FET2-3 may be p-type metal-oxide semiconductor field-effect transistors (PMOSFETs). In order to turn on the first switches FET1-1, FET1-2, and FET1-3 and the second switches FET2-1, FET2-2, and FET2-3, when the first through third battery cells 221, 222, and 223 are in overcharge or over discharge states, the cell control units 121, 122, and 123 generate low-level signals through output terminals V1 or V2.

In detail, when over discharge of the battery cells 221, 222, and 223 is detected, the cell control units 121, 122, and 123 generate low-level signals, output the low-level signals to V1 terminals, and apply the low-level signals to gates of the first switches FET1-1, FET1-2, and FET1-3 to turn on the first switches FET1-1, FET1-2, and FET1-3. Also, when overcharge of the first through third battery cells 221, 222, and 223 is detected, the cell control units 121, 122, and 123 generate low-level signals, output the level-level signals to V2 terminals, and apply the low-level signals to gates of the second switches FET2-1, FET2-2, and FET2-3 to turn on the second switches FET2-1, FET2-2, and FET2-3. On the contrary, when the first through third battery cells 221, 222, and 223 are in normal states, the cell control units 121, 122, and 123 generate high-level signals, output the high-level signals to the V1 terminals and the V2 terminals, and apply the high-level signals to the gates of the first switches FET1-1, FET1-2, and FET1-3 and the second switches FET2-1, FET2-2, and FET2-3 to turn off the first switches FET1-1, FET1-2, and FET1-3 and the second switches FET2-1, FET2-2, and FET2-3.

For example, when over discharge of the first battery cell 221 in the second battery module 220 is detected, the first cell control unit 121 outputs a low-level signal through the V1 terminal, and thus the first switch FET1 connected to the first battery cell 221 is turned on.

Each of the cell control units 121, 122, and 123 may be a general 1-cell control integrated circuit (IC). The cell control units 121, 122, and 123 may include voltage detection units for detecting voltages of the first through third battery cells 221, 222, and 223 connected to the cell control units 121, 122, and 123, respectively. Also, the voltage detection units may each include one or more comparators. Each comparator may determine whether an actual voltage of a battery cell is higher or lower than a reference voltage. The cell control units 121, 122, and 123 generate high or low-level signals by referring to a result obtained when the comparator compares the actual voltage of the battery cell with the reference voltage.

The reference voltage, which is preset, may be a charge limit or a discharge limit by which the second battery module 220 may operate safely. The cell control units 121, 122, and 123 determine that there is a risk of overcharge when voltages of the first through third battery cells 221, 222, and 223 are equal to or greater than the charge limit, and determine that there is a risk of over discharge when voltages of the first through third battery cells 221, 222, and 223 are equal to or less than the discharge limit.

The second battery management unit 120 is connected to the charge/discharge control unit 130 through the first switches FET1-1, FET1-2, and FET1-3, and second switches FET2-1, FET2-2, and FET2-3. In detail, the first switches FET1-1, FET1-2, and FET1-3 are connected to a third switch FET3 in the charge/discharge control unit 130, and the second switches FET2-1, FET2-2, and FET2-3 are connected to a fourth switch FET4 in the charge/discharge control unit 130. In detail, drains of the first switches FET 1-1, FET 1-2, and FET 1-3 are connected to a gate of the third switch FET3, and drains of the second switches FET2-1, FET2-2, and FET2-3 are connected to a gate of the fourth switch FET4. The third switch FET3 and the fourth switch FET4 in the charge/discharge control unit 130 may be NMOSs as shown in FIG. 2.

As shown in FIG. 2, one or more resistors R1 and R2 may be connected to a line that connects the first switches FET1-1, FET1-2, and FET1-3 and the third switch FET3, and one or more resistors R7 and R8 may be connected to a line that connects the second switches FET2-1, FET2-2, and FET2-3 and the fourth switch FET4. When values of the drains of the first switches FET1-1, FET1-2, and FET1-3 or the second switches FET2-1, FET2-2, and FET2-3 are directly applied to the gate of the third switch FET3 or the fourth switch FET4, there is a risk of overload in the third switch FET3 or the fourth switch FET4. Accordingly, in order to distribute the voltage values to the gate, the resistors R1 and R2, and R7 and R8 may be appropriately disposed. Also, although not shown in FIG. 2, additional resistors may be further disposed in order for each MOSFET to operate in a normal state.

When the first switches FET1-1, FET1-2, and FET1-3 are turned off, the third switch FET3 connected to the first switches FET1-1, FET1-2, and FET1-3 is turned off. That is, when each battery cell of the first battery module 210 is in a normal state, the third switch FET3 is turned off. On the contrary, when each battery cell of the first battery module 210 is in an overcharge or over discharge state, the third switch FET3 is turned on.

Also, when the second switches FET2-1, FET2-2, and FET2-3 are turned off, the fourth switch FET4 connected to the second switches FET2-1, FET2-2, and FET2-3 is turned off. That is, when each battery cell in the first battery module 210 is in a normal state, the fourth switch FET4 is turned off. On the contrary, when each battery cell of the first battery module 210 is in an overcharge or over discharge state, the fourth switch FET4 is turned on.

Referring to FIG. 2, a drain of the third switch FET3 of the charge/discharge control unit 130 is connected to a gate of the discharge control switch FET5, and a drain of the fourth switch FET4 is connected to a gate of the charge control switch FET6. The charge control switch FET6 and the discharge control switch FET5 may be NMOSs as described above. That is, the charge control switch FET6 and the discharge control switch FET5 are turned on when a high-level signal is applied, and are turned off when a low-level signal is applied. Also, referring to FIG. 2, resistors R3 and R4, and R5 and R6 may be disposed to apply a voltage equal to or less than a rated voltage to the gates of the charge control switch FET6 and the discharge control switch FET5.

In detail, when the third switch FET3 is turned off, the discharge control switch FET5 is turned on. As the third switch FET3 is turned off, since a distribution voltage between the resistors R3 and R4 becomes a gate voltage of the discharge control switch FET5, a high-level signal is applied to the gate of the discharge control switch FET5. Also, when the third switch FET3 is turned on, since a gate voltage of the discharge control switch FET5 connects with a ground state GND, the discharge control switch FET5 to which a low-level signal is applied is turned off.

Likewise, when the fourth switch FET4 is turned off, the charge control switch FET6 is turned on. As the fourth switch FET4 is turned off, since a distribution voltage between the resistor R5 and the resistor R6 becomes a gate voltage of the charge control switch FET6, a high-level signal is applied to the gate of the charge control switch FET6. Also, when the fourth switch FET4 is turned on, since a gate voltage of the charge control switch FET6 connects with a ground state GND, the charge control switch FET6 to which a low-level signal is applied is turned off.

In sum, when the first through third battery cells 221, 222, and 223 of the second battery module 220 are in normal states, high-level signals are applied to the first switches FET 1-1, FET 1-2, and FET 1-3 and the second switches FET2-1, FET2-2, and FET2-3. Since the first switches FET1-1, FET1-2, and FET1-3 and the second switches FET2-1, FET2-2, and FET2-3 are PMOSs, once high-level signals are applied to the first switches FET1-1, FET1-2, and FET1-3 and the second switches FET2-1, FET2-2, and FET2-3, the first switches FET1-1, FET1-2, and FET1-3 and the second switches FET2-1, FET2-2, and FET2-3 are turned off. As the first switches FET1-1, FET1-2, and FET1-3 and the second switches FET2-1, FET2-2, and FET2-3 are turned off, low-level signals are applied to the gates of the third switch FET3 and the fourth switch FET4 and the third switch FET3 and the fourth switch FET4 are turned off. Accordingly, high-level signals are applied to the gates of the charge control switch FET6 and the discharge control switch FET5 and the charge control switch FET6 and the discharge control switch FET5 are turned on. That is, when the first through third battery cells 221, 222, and 223 of the second battery module 220 are in normal states, the charge control switch FET6 and the discharge control switch FET5 are turned on.

Even when the second battery module 220 is in a normal state and the first battery module 110 is in an over discharge state, since the microprocessor 112 applies a ground voltage to the gate of the discharge control switch FET5, the discharge control switch FET5 is turned off. Likewise, even when the second battery module 220 is in a normal state and the first battery module 110 is in an overcharge state, since the microprocessor 112 applies a ground voltage to the gate of the charge control switch FET6, the charge control switch FET6 is turned off.

On the contrary, when the first through third battery cells 221, 222, and 223 of the second battery module 220 are in over discharge states, low-level signals are applied to the first switches FET1-1, FET1-2, and FET1-3. Since the first switches FET1-1, FET1-2, and FET1-3 are PMOSs, once low-level signals are applied to the first switches FET1-1, FET1-2, and FET1-3, the first switches FET1-1, FET1-2, and FET1-3 are turned on. As the first switches FET1-1, FET1-2, and FET1-3 are turned on, high-level signals are applied to the gate of the third switch FET3 which is an NMOS and the third switch FET3 is turned on. Accordingly, low-level signals are applied to the gate of the discharge control switch FET5 and the discharge control switch FET5 is turned off. That is, when the first through third battery cells 221, 222, and 223 of the second battery module 220 are in over discharge states, the discharge control switch FET5 is turned off.

Also, when the first through third battery cells 221, 222, and 223 of the second battery module 220 are in overcharge states, low-level signals are applied to the second switches FET2-1, FET2-2, and FET2-3. Since the second switches FET2-1, FET2-2, and FET2-3 are PMOSs, once low-level signals are applied to the second switches FET2-1, FET2-2, and FET2-3, the fourth switch FET4 is turned on. As the second switches FET2-1, FET2-2, and FET2-3 are turned on, high-level signals are applied to the gate of the fourth switch FET4 which is an NMOS and the fourth switch FET4 is turned on. Accordingly, low-level signals are applied to the gate of the charge control switch FET6 and the charge control switch FET6 is turned off. That is, when the first through third battery cells 221, 222, and 223 of the second battery module 220 are in overcharge states, the charge control switch FET6 is turned off.

In such a manner, without providing an additional battery management unit including an ADC in the second battery module 220, an overcharge or over discharge state of each of the first through third battery cells 221, 222, and 223 of the second battery module 220 may be detected and the charge control switch FET6 and the discharge control switch FET5 may be controlled.

As described above, there a limitation to the number of battery cells which the first battery management unit 110 for detecting an overcharge or over discharge state of a battery cell may manage. In FIG. 2, the number of battery cells which the first battery management unit 110 may manage in a digital manner may be four. The first battery management unit 110 controls charge/discharge of each battery cell in a digital manner by receiving a state of each battery cell, converting the state from an analog signal to a digital signal, and outputting a corresponding charge/discharge control signal. Accordingly, when the number of battery cells which the first battery management unit 110 may manage in a digital manner is equal to or greater than a predetermined number, a high capacity battery management unit is additionally required.

However, instead of providing a high capacity battery management unit in order to control charge/discharge of surplus battery cells, according to the present embodiment, the first battery management unit 110 is used and the second battery management unit 120 that controls a battery cell in an analog manner controls charge/discharge of surplus battery cells, thereby preventing overcharge or over discharge of the battery cells.

The terminal unit 300 is connected to an external device such as an electronic device or the charger 400 which is a wired charger. The terminal unit 300 includes an anode terminal 310 and a cathode terminal 320. The terminal unit 300 is connected in parallel to the battery module 200, and is connected to the external device to charge or discharge the battery module 200. A path between the terminal unit 300 and the battery module 200 is a high current path used as a charge/discharge path. Relatively large current flows through the high current path.

Figure 3:
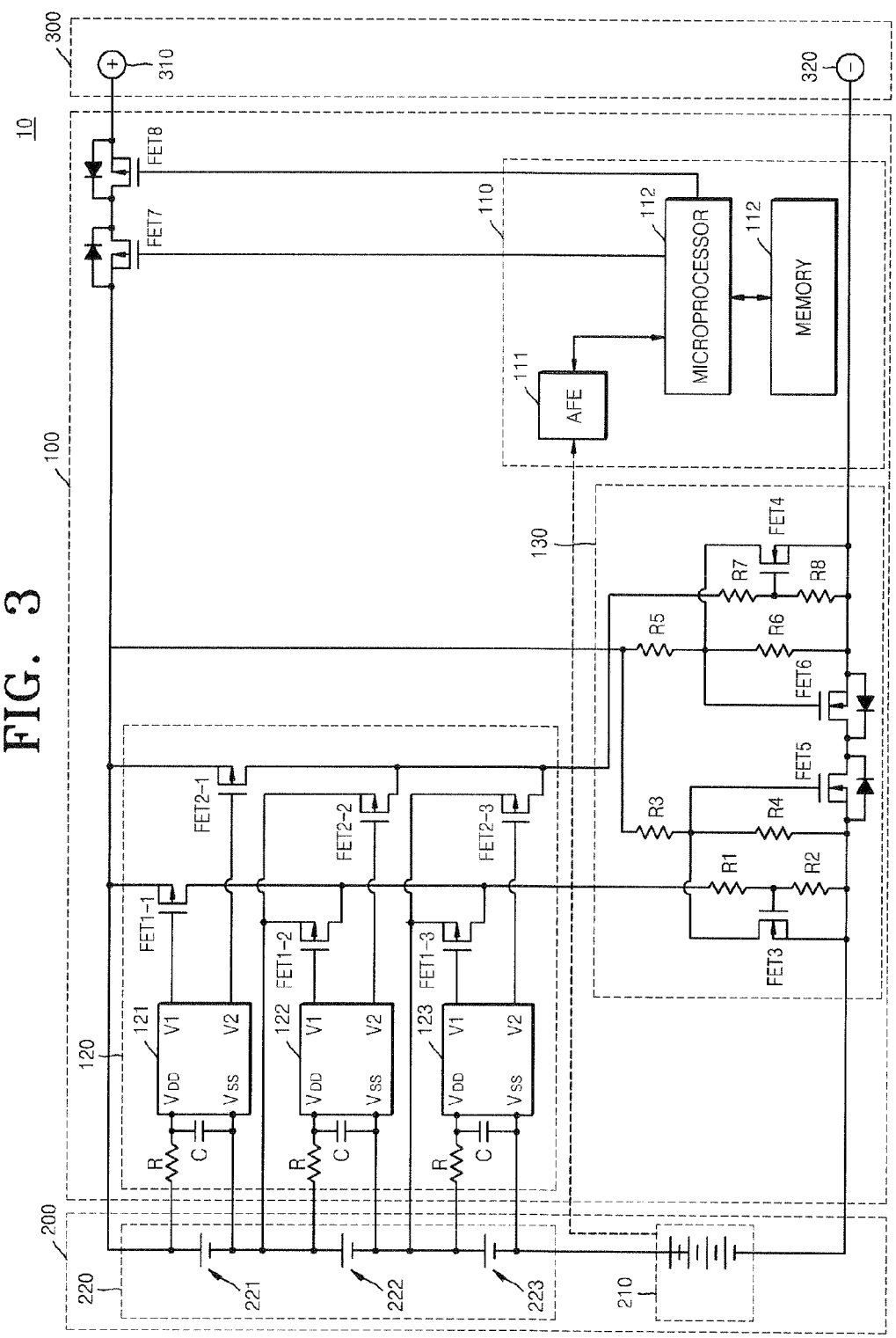
FIG. 3 is a circuit diagram illustrating the battery pack according to another embodiment of the present invention.

FIG. 3 is a circuit diagram illustrating the battery pack 10 according to another embodiment of the present invention.

FIG. 3 is a modification of FIG. 2 and thus a repeated explanation will not be given.

In FIG. 3, switches for controlling charge/discharge of the first battery module 210 and switches for controlling charge/discharge of the second battery module 220 are provided.

Referring to FIG. 3, unlike in FIG. 2, connection lines for directly controlling the charge control switch FET6 and the discharge control switch FET5 are omitted from the microprocessor 112 of the first battery management unit 110. Instead, the microprocessor 112 communicates with an additional charge control switch FET7 and an additional discharge control switch FET8.

Accordingly, charge/discharge of the second battery module 220 is controlled by using the charge control switch FET6 and the discharge control switch FET5 like in FIG. 2, and charge/discharge of the first battery module 210 is controlled by using the additional charge control switch FET7 and the additional discharge control switch FET8.

Figure 4:
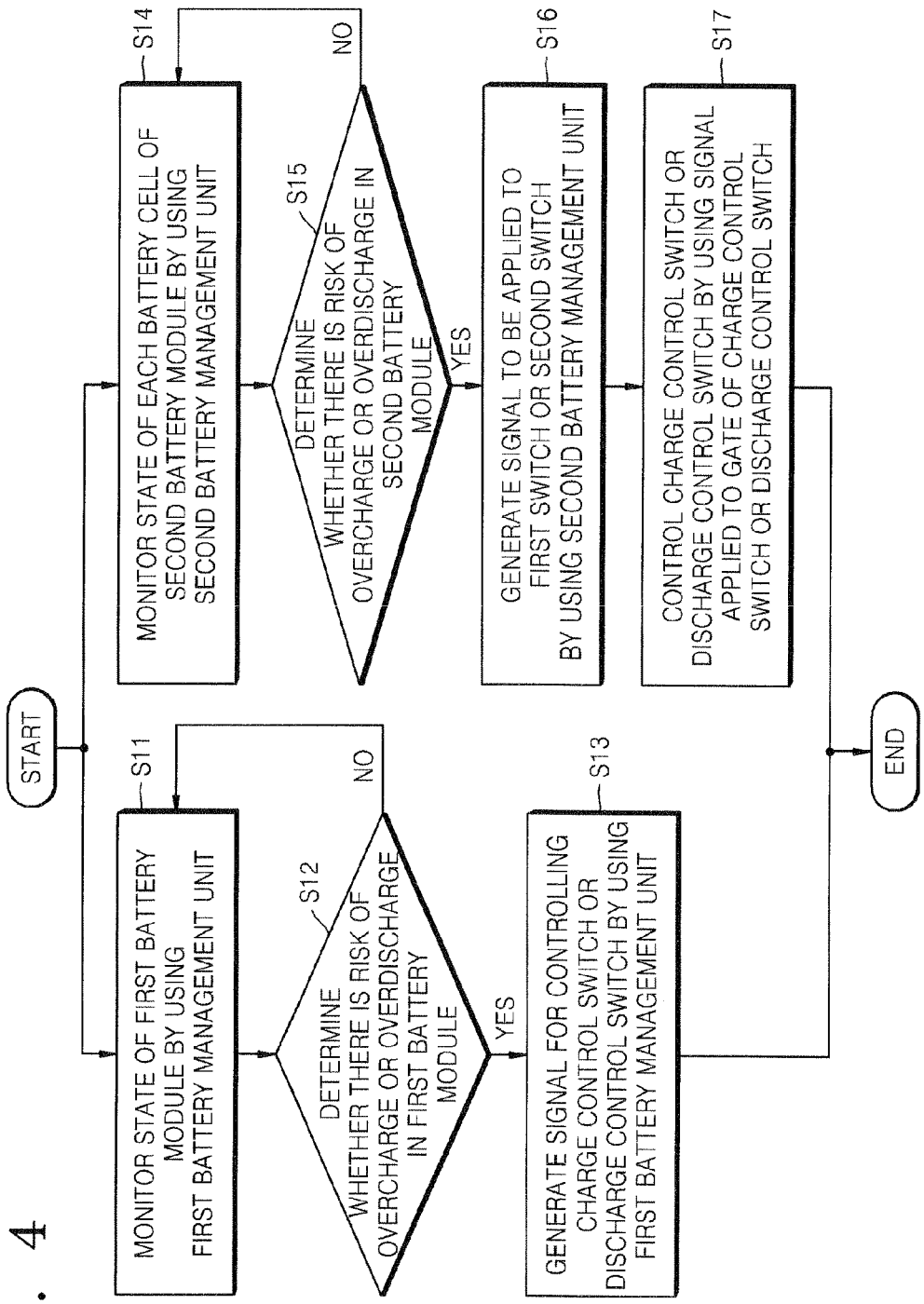
FIG. 4 is a flowchart illustrating a method of operating the battery pack according to an embodiment of the present invention.

FIG. 4 is a flowchart illustrating a method of operating the battery pack 10, according to an embodiment of the present invention.

In operation S11, the first battery management unit 110 monitors a state of the first battery module 210 in a digital manner.

In operation S12, it is determined whether there is a risk of overcharge or over discharge in the first battery module 210. When it is determined in operation S12 that there is a risk of overcharge or over discharge in the first battery module 210, the method proceeds to operation S13. In operation S13, a signal for controlling the charge control switch FETE or the discharge control switch FET5 is generated. When it is determined in operation S12 that there is no risk of overcharge or over discharge in the first battery module 210, the method returns to operation S11 in which the first battery management unit 110 continuously monitors the state of the first battery module 210. In operation S14, the second battery management unit 120 monitors a state of each of the first through third battery cells 221, 222, and 223 of the second battery module 220 in an analog manner by using the cell control units 121, 122, and 123.

In operation S15, it is determined whether there is a risk of overcharge or over discharge in the second battery module 220. When it is determined in operation S15 that there is a risk of overcharge or over discharge in the second battery module 220, the method proceeds to operation S16. In operation S16, the second battery management unit 120 generates a signal to be applied to the first switches FET 1-1, FET 1-2, and FET 1-3 or the second switches FET2-1, FET2-2, and FET2-3. In operation S17, the charge control switch FET6 or the discharge control switch FET5 is controlled by using a signal applied to the gate of the charge control switch FET6 or the discharge control switch FET5.

When it is determined in operation S15 that there is no risk of overcharge or over discharge in the second battery module 220, the method returns to operation S14 in which the second battery management unit 120 monitors a state of the second battery module 220.

Figure 5:
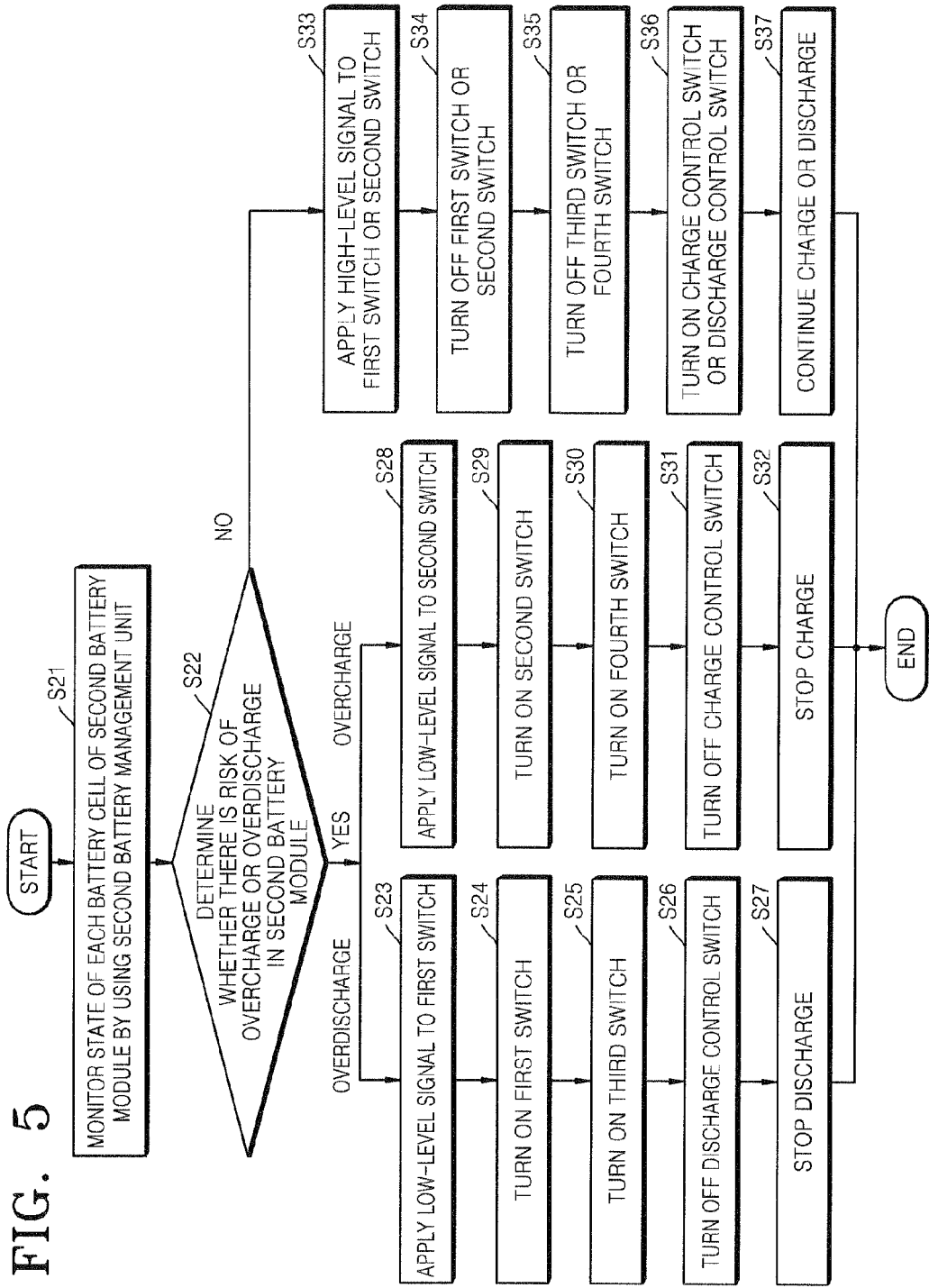
FIG. 5 is a flowchart illustrating an operation of a second battery management unit, according to an embodiment of the present invention.

FIG. 5 is a flowchart illustrating an operation of the second battery management unit 120, according to an embodiment of the present invention.

In operation S21, the second battery management unit 120 monitors a state of each of the first through third battery cells 221, 222, and 223 of the second battery module 220.

In operation S22, it is determined whether there is a risk of overcharge or over discharge in the second battery module 220.

When it is determined in operation S22 that there is a risk of over discharge in the second battery module 220, the method proceeds to operation S23. In operation S23, the second battery management unit 120 applies a low-level signal to a corresponding first switch. In operation S24, the corresponding first switch is turned on. In operation S25, the third switch FET3 is turned on. In operation S26, the discharge control switch FET5 is turned off. In operation S27, since the discharge control switch FET5 is turned off, discharge is stopped.

When it is determined in operation S22 that there is a risk of overcharge in the second battery module 220, the method proceeds to operation S28. In operation S28, the second battery management unit 120 applies a low-level signal to a corresponding second switch. In operation S29, the corresponding second switch is turned on. In operation S30, the fourth switch FET4 is turned on. In operation S31, the charge control switch FET6 is turned off. In operation S32, since the charge control switch FET6 is turned off, charge is stopped.

Also, when it is determined in operation S22 that the second battery module 220 is in a normal state with no risk of overcharge or over discharge, the method proceeds to operation S33. In operation S33, the second battery management unit 120 applies a high-level signal to the corresponding first switch or the corresponding second switch. In operation S34, the corresponding first switch or the corresponding second switch is turned off. In operation S35, the third switch FET3 or the fourth switch FET4 is turned off. In operation S36, the charge control switch FET6 or the discharge control switch FET5 is turned on. In operation S37, since the charge control switch FET6 or the discharge control switch FET5 is turned on, charge or discharge is continued.

As described above, according to a battery pack and a method of controlling the same of the one or more embodiments of the present invention, since a protection circuit that may control charge/discharge of additional battery cells is used, costs may be reduced.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

While the present invention has been particularly shown and described with reference to exemplary embodiments thereof by using specific terms, the embodiments and terms have merely been used to explain the present invention and should not be construed as limiting the scope of the present invention as defined by the claims. The exemplary embodiments should be considered in a descriptive sense only and not for purposes of limitation.

Therefore, the scope of the invention is defined not by the detailed description of the invention but by the appended claims, and all differences within the scope will be construed as being included in the present invention.

What is claimed is:

1. A battery pack comprising:
   a first battery module that comprises at least one battery cell;
   a second battery module that comprises at least one battery cell electrically connected to the first battery module;
   a charge/discharge control unit that comprises a charge control switch and a discharge control switch to break or connect a charge/discharge path of each of the first battery module and the second battery module;
   a first battery management unit that controls the first battery module and that generates a signal for directly controlling the charge control switch or the discharge control switch by referring to a state of the first battery module only; and
   a second battery management unit that generates a signal for controlling the charge control switch or the discharge control switch through switch elements connected to the second battery management unit by referring to a state of the second battery module only,
   wherein the first battery management unit and the second battery management unit are connected in parallel to the charge/discharge control unit,
   wherein, when battery cells, a number of which exceeds a maximum number of battery cells that can be managed by the first battery management unit, are required, the second battery module is a set of surplus battery cells added to the first battery module.

2. The battery pack of claim 1, wherein the second battery management unit comprises:
   a cell control unit that determines whether there is a risk of overcharge or over discharge by detecting a state of each of the at least one battery cell included in the second battery module; and
   a first switch and a second switch that operate by receiving a signal from the cell control unit.

3. The battery pack of claim 2, wherein the second battery management unit generates a signal for turning on the first switch when there is a risk of over discharge in the at least one battery cell included in the second battery module.

4. The battery pack of claim 3, wherein when the first switch is turned on, a third switch that is connected to the first switch and is included in the charge/discharge control unit is turned on and the discharge control switch that is connected to the third switch is turned off.

5. The battery pack of claim 2, wherein the second battery management unit generates a signal for turning on the second switch when there is a risk in the at least one battery cell included in the second battery module.

6. The battery pack of claim 5, wherein when the second switch is turned on, a fourth switch that is connected to the second switch and is included in the charge/discharge control unit is turned on and the charge control switch that is connected to the fourth switch is turned off.

7. The battery pack of claim 2, wherein the second battery management unit generates a signal for turning off the first switch or the second switch when the at least one battery cell included in the second battery module is in a normal state with no risk of overcharge or over discharge.

8. The battery pack of claim 7, wherein when the first switch is turned off, a third switch that is connected to the first switch and is included in the charge/discharge control unit is turned off and the discharge control switch that is connected to the third switch is turned on.

9. The battery pack of claim 7, wherein when the second switch is turned off, a fourth switch that is connected to the second switch and is included in the charge/discharge control unit is turned off and the charge control switch that is connected to the fourth switch is turned on.

10. The battery pack of claim 2, wherein the cell control unit determines whether there is a risk of overcharge or over discharge in the at least one battery cell included in the second battery module by comparing a state of charge (SOC) of each of the at least one battery cell with a reference state of charge (SOC).

11. The battery pack of claim 1, wherein the first battery management unit comprises:
   an analog front end that converts an analog value about a state of the first battery module into a digital value; and
   a microprocessor that transmits a signal to the charge/discharge control unit;
   a memory that stores a setting value of the microprocessor.

12. The battery pack of claim 1, wherein when the charge and discharge control switches included in the charge/discharge control unit are metal-oxide semiconductor field-effect transistors (MOSFETs), the charge/discharge control unit comprises a resistor for adjusting a voltage applied to gates of the charge and discharge control switches.

13. A battery pack comprising:
- a first battery module that comprises at least one battery cell;
- a second battery module that comprises at least one battery cell electrically connected to the first battery module;
- a protection circuit that controls charge/discharge of the first battery module and the second battery module; and
- a terminal unit that connects the first battery module and the second battery module to an external device. wherein the protection circuit comprises:
- a charge/discharge control unit that breaks or connects a charge/discharge path of each of the first battery module and the second battery module;
- a first battery management unit that detects a state of the first battery module only and that controls the charge/discharge the first battery module; and
- a second battery management unit that generates a signal for controlling switches included in the charge/discharge control unit by referring to a state of the second battery module only,
- wherein, when battery cells, a number of which exceeds a maximum number of battery cells that can be managed by the first battery management unit, are required, the second battery module is a set of surplus battery cells added to the first battery module.

* * * * *